United States Patent
Mourn

(10) Patent No.: US 9,747,186 B1
(45) Date of Patent: Aug. 29, 2017

(54) METHOD FOR BLOCKING BUS RESETS IN A IEEE-1394 HIGH-PERFORMANCE SERIAL BUS

(71) Applicant: Richard Mourn, Colorado Springs, CO (US)

(72) Inventor: Richard Mourn, Colorado Springs, CO (US)

(*) Notice: Subject to any disclaimer, the term of this patent is extended or adjusted under 35 U.S.C. 154(b) by 330 days.

(21) Appl. No.: 14/584,692

(22) Filed: Dec. 29, 2014

(51) Int. Cl.
G06F 13/00 (2006.01)
G06F 11/34 (2006.01)
G06F 13/42 (2006.01)

(52) U.S. Cl.
CPC ........ *G06F 11/349* (2013.01); *G06F 13/4282* (2013.01)

(58) Field of Classification Search
None
See application file for complete search history.

(56) References Cited

U.S. PATENT DOCUMENTS

| | | | | |
|---|---|---|---|---|
| 6,134,656 A * | 10/2000 | LaBerge | ............... | G06F 13/423 710/108 |
| 6,412,076 B1 * | 6/2002 | Honda | ................. | G11B 31/006 382/312 |
| 2002/0049933 A1 * | 4/2002 | Nyu | ....................... | H04L 41/064 714/43 |
| 2004/0162928 A1 * | 8/2004 | Benson | ............... | G06F 13/4022 710/301 |
| 2008/0244029 A1 * | 10/2008 | Soga | .................. | G06F 11/0742 709/209 |
| 2009/0327686 A1 * | 12/2009 | Kochar | ..................... | G06F 8/65 713/100 |

OTHER PUBLICATIONS

IEEE Xplore; IEEE Standard for a High-Performance Serial Bus; Oct. 21, 2008; IEEE Xplore; pp. 446-457.*

* cited by examiner

*Primary Examiner* — Elias Mamo
(74) *Attorney, Agent, or Firm* — Edwin H. Crabtree; Ramon L. Pizarro

(57) ABSTRACT

A method of delaying or blocking new bus resets from propagating while a previous bus initialization (bus reset, tree-id or self-id) is in process during the performance of a IEEE-1394 serial bus. The method provides for more robust Beta only bus operation during high frequency bus resets. The bus resets are caused by noise events, power-up and power-down sequences and other bus reset causing events.

6 Claims, 3 Drawing Sheets

METHOD FOR BLOCKING BUS RESETS IN A IEEE-1394 HIGH-PERFORMANCE SERIAL BUS

BACKGROUND OF THE INVENTION (a) Field on Invention

This invention relates to the performance of a IEEE-1394 serial bus, and more particularly, but not by way of limitation, to a method of delaying or blocking new bus resets from propagating while a previous bus initialization (bus reset, tree-id or self-id) is in process. The method provides for more robust Beta only bus operation during high frequency bus resets. The bus resets are caused by noise events, power-up and power-down sequences and other bus reset causing events.

(b) Discussion of Prior Art

IEEE-1394-2008 defines Legacy or Alpha nodes and Beta nodes. Legacy nodes are based on earlier versions of the IEEE-1394 standard (IEEE-1394-1995 and IEEE-1394a-2000), while Beta nodes are based on IEEE-1394b-2002. There are many differences between Legacy node and Beta node implementations. But, for the purposes of this application, Legacy nodes do not support loops in a topology while Beta nodes do support loops in the topology. By definition, a loop in a topology is where a node port connects back to the same node through 0 to N nodes in a node cloud.

Heretofore, there have been a number of IEEE 1394-coupled communication system and method patents. For example, they are U.S. Pat. No. 7,681,051 to Liu et al., U.S. Pat. No. 7,036,031 to Takeuchi, U.S. Pat. No. 6,912,596 to Skidmore, U.S. Pat. No. 6,523,073 to Kammer et al., and U.S. Pat. No. 6,412,076 to Honda et al.

None of these patents describe the unique features and method for specific improved robustness of Beta only bus topologies by delaying or blocking new bus resets from propagating during bus initialization.

SUMMARY OF THE INVENTION

In view of the foregoing, it is a primary object of the subject invention to reduce the occurrence of disconnects in a Beta only bus topology as caused by Legacy loop detection during bus initialization caused by noise events, power-up and power-down sequencing or other bus reset causing events. The noise events can be caused by lightning strikes, a strobe light, static electricity and the like.

Another object of the invention is reduce the occurrence of disconnects caused by devices not implementing this method or a method that disables a Legacy loop detection logic when devices implementing this method are present in the same topology.

These and other objects of the present invention will become apparent to those familiar with different versions of Legacy node and Beta node IEEE-1394 technology when reviewing the following detailed description, showing novel construction, combination, and elements as described herein

BRIEF DESCRIPTION OF THE DRAWINGS

The accompanying drawings illustrate complete preferred embodiments in the present invention according to the best modes presently devised for the practical application of the subject method for blocking bus resets, and in which.

DETAILED DESCRIPTION OF THE PREFERRED EMBODIMENTS

Figure 1:
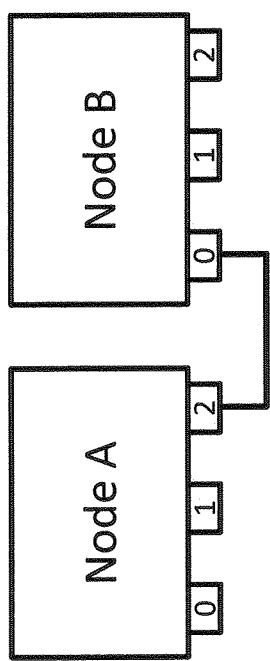
FIG. 1 illustrates a Node A and a Node B connected in a single topology.

In FIG. 1, Nodes A and B are shown connected in a single topology. In this drawing, if Node A generates four (4) consecutive bus resets spaced close enough together that when Node B doesn't transition into S1: Self-ID Grant or S2: Self-ID Receive state between bus resets then Node B's resetCount variable will become greater than three (3) which will cause Node B to disconnect from Node A.

Figure 2:
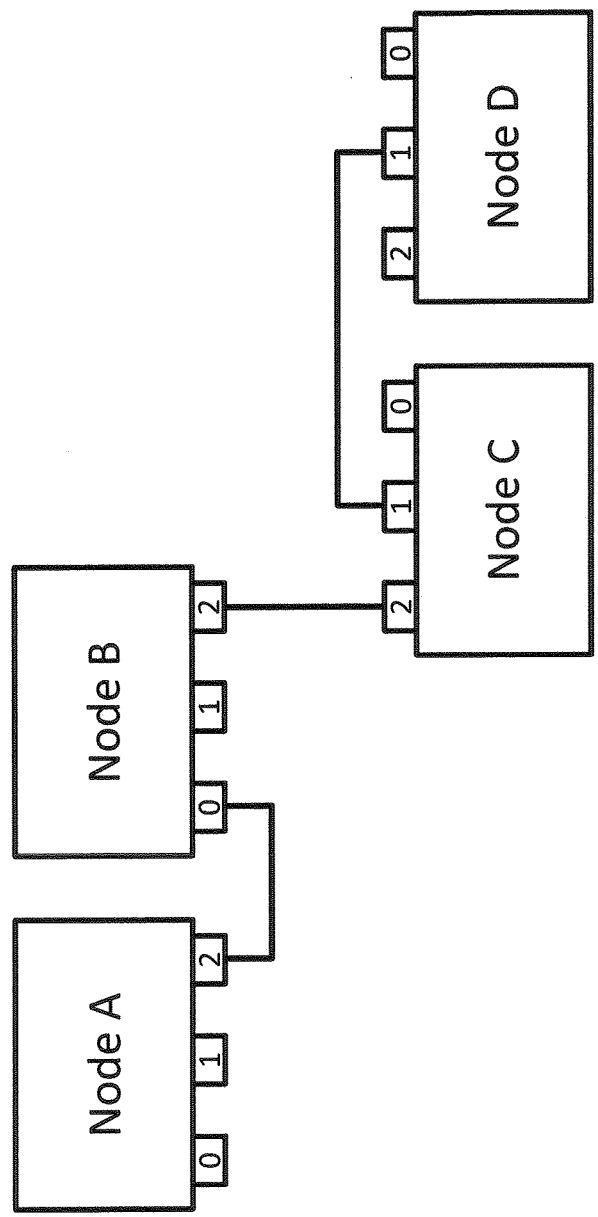
FIG. 2 illustrates Nodes A and B connected to Nodes C and D in a single topology.

In FIG. 2, Nodes A, B, C and D are shown connected in a single topology. In this drawing, if Node A generates four (4) consecutive bus resets that when repeated by Node B becomes spaced close enough together that when Node C doesn't transition to S1: Self-ID Grant or S2: Self-ID Receive state between bus resets then Node C's resetCount variable will become greater than three (3) which will cause Node C to disconnect from Node B thus temporarily creating two separate node topologies, such as Nodes A and B and Nodes C and D.

Figure 3:
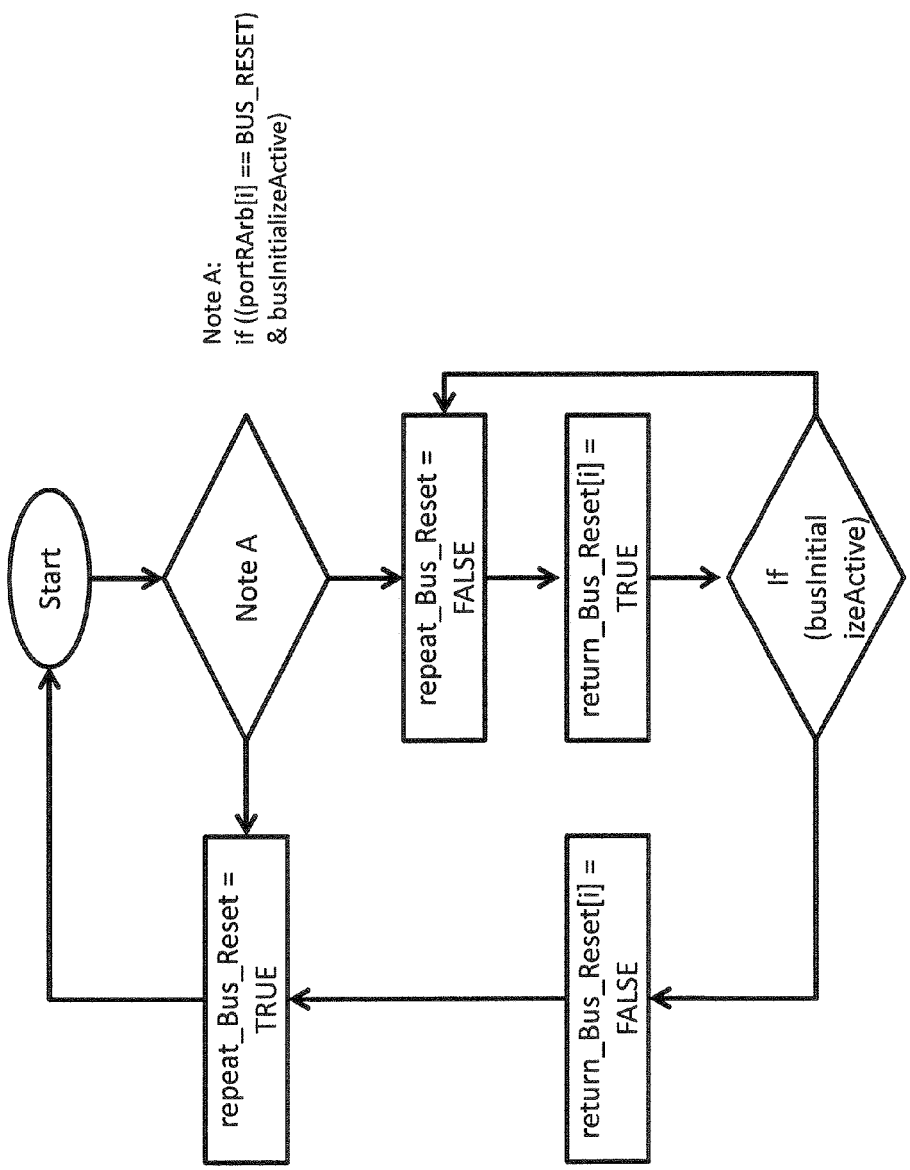
FIG. 3 illustrates the decision process a node uses to determine if a bus reset should be blocked or not.

In FIG. 3, a Node implementing this invention tests each connected port of its PHY and if a bus reset is detected, portRArb[i]==BUS_RESET, and busInitializeActive, the PHY is currently in a bus initialize state (R1|T0|T1|T2|T3|S0|S1|S2|S3|S4), the PHY will block the propagation, repeat_Bus_Reset=FALSE, the received bus reset to its other active ports. The PHY port receiving the bus reset responds with bus reset, return_Bus_Reset[i]=TRUE. When the other ports transition out of a bus initialize state, busInitializeActive=FALSE, the received bus reset is then repeated to its other active ports, repeat_Bus_Reset=TRUE.

This behavior was designed into the IEEE-1394-2008 standard to detect a loop between Alpha nodes during bus initialization as described in the IEEE-1394-2008 section "14.7.13 Loop detection during bus initialization":

Some loop conditions may be detected during bus initialization. They are:
a) Configuration timeout (in the T0: Tree ID Start state), which can occur if the node is on a loop and either that loop includes one or more Alpha nodes or the loop is formed as a result of a connection on the bus being resumed.
b) Arbitration state timeout, which can occur up to the time when the port enters the S1: Self-ID Grant or S2: Self-ID Receive state if the node is connected to a network of Alpha nodes that are in a loop.
c) Repeated resets, which can occur in similar circumstances to condition b with a loop on a network that includes IEEE 1394 nodes that use a shorter arbitration state timeout."

While in most cases this functionality is desirable. Also, some applications can guarantee either Alpha nodes are not preset, Beta nodes only, or Alpha nodes cannot be connected in a loop. Furthermore, in some environments, it is possible that bus resets can be generated quickly enough to cause a Beta node PHY ports to incorrectly disable a connection between two different nodes for reasons other than a loop between Alpha nodes.

It should be noted that Texas Instruments (TI) TSB41BA3 and TSB81BA3 PHYs do not behave exactly as the IEEE-1394 standard defines. In fact, it appears these PHYs do not clear the resetCount variable until the PHY transitions from the Self-id to normal arbitration state AO. This creates, especially in large topologies, a much larger timing window in which four (4) consecutive bus resets could cause resetCount to be greater than three (3) and cause a port to disconnect.

The method described below provides a programmable implementation that provides both backward compatibility and software/hardware programmable means to enable this new functionality. In addition, to the method described below, other methods may be implemented that provide the same desired results.

The Block Bus Reset Propagation Method determines that if a bus reset signal (portRArb[i]==BUS_RESET) is received while the PHY is currently in the R1, T0, T1, T2, T3, S0, S1, S2, S3 or S4 states (busInitializeActive==TRUE) the PHY won't propagate (repeat_Bus_Reset=FALSE) the bus reset until the other connected port(s) transition to the A0 (Arbitration state zero) state. The port receiving the bus reset responds by returning bus reset, return_Bus_Reset[i]=TRUE. This guarantees the PHY receiving the new bus reset will block the propagation of bus reset until the bus reset, tree-id and self-id processes complete. Additionally, the method prohibits the PHY from initiating consecutive bus resets until its ports transition through the Bus Reset, Tree-ID and Self-ID states to the Arbitration zero state.

Also referring to FIG. 2, if Node A generates four (4) consecutive bus resets and Node B implements the Block Bus Reset Propagation Method and the method is enabled, Node B won't propagate subsequent bus resets until the topology comprised of Nodes B, C and D transition out of the Bus Reset, Tree-ID or Self-ID state to the Arbitration zero state. This will allow the resetCount variable to be cleared in nodes B, C and D thereby not causing any of those nodes to experience a legacy loop detect event during bus initialization as described in the IEEE-1394-2008 section "14.7.13 Loop detection during bus initialization".

When one or more PHY's implementing the Block Bus Reset Propagation Method are connected to an IEEE-1394 bus with PHY's allowing legacy loop detect, the probability the resetCount value will exceed there (3) is reduces. Of course the more nodes that implement this method and are directly connected to PHYs with the legacy loop detect logic enabled, the lower the probability a port will be disabled due to resetCount being greater than 3.

The embodiments of the invention for which an exclusive privilege and property right is claimed are defined as follows:

1. A method for preventing propagation of received bus resets through a Beta node (B) PHY port thereby providing a more robust Beta bus topology operation during high frequency bus resets, the method comprising:
   blocking a bus reset, when received on the Beta node (B) PHY port, and preventing the received bus reset from propagating through the Beta node (B) PHY port while other Beta node (B) PHY ports are in a bus initialize state;
   preventing a Beta node (C) PHY port connected to the Beta node (B) PHY port from observing consecutive bus resets while the Beta node (C) PHY port is still in a bus initialize state; and
   preventing the Beta node (C) PHY port from incrementing a bus reset counter from counting a value greater than three (3) during the bus initialize state.

2. The method of claim 1 wherein the Beta node (B) PHY port receiving the bus reset will respond to the received bus reset with a bus reset.

3. The method of claim 1 wherein the Beta node (B) PHY port will propagate a bus reset when other Beta node (B) PHY ports are not in a bus initialize state.

4. The method of claim 1 wherein the bus initialize state is defined by IEEE-1394: R1, T0, T1, T2, T3, S0, S1, S3 or S4.

5. A method for preventing propagation of received bus resets through a IEEE-1394 Beta node (B) PHY port thereby providing a more robust Beta bus topology during high frequency bus resets, the method comprising:
   blocking a bus reset, when received on the Beta node (B) PHY port, and preventing the received bus reset from propagating through the Beta node (B) PHY port while other Beta node (B) PHY ports are in a bus initialize state (NOTE: Made this the same as claim 1 but referenced specifically to IEEE-1394-2008); and
   preventing a IEEE-1394-2008 Beta node (C) PHY port connected to the Beta node (B) PHY port from observing greater than three (3) consecutive bus resets while the Beta node (C) PHY port is still in a bus initialize state.

6. The method of claim 5 wherein the bus initialize state is defined by IEEE-1394: R1, T0, T1, T2, T3, S0, S1, S3 or S4.

* * * * *